(12) United States Patent
Boisson et al.

(10) Patent No.: US 9,204,122 B2
(45) Date of Patent: Dec. 1, 2015

(54) ADAPTATION OF 3D VIDEO CONTENT

(75) Inventors: Guillaume Boisson, Pleumeleuc (FR);
Paul Kerbiriou, Thorigne-Fouillard (FR); Olivier Bureller, Cesson Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 813 days.

(21) Appl. No.: 13/136,857

(22) Filed: Aug. 13, 2011

(65) Prior Publication Data
US 2012/0075419 A1    Mar. 29, 2012

(30) Foreign Application Priority Data

Sep. 23, 2010   (EP) ................................ 10306023

(51) Int. Cl.
*G06T 7/00*   (2006.01)
*H04N 13/00*  (2006.01)

(52) U.S. Cl.
CPC .......... *H04N 13/0033* (2013.01); *G06T 7/0075* (2013.01); *H04N 13/0003* (2013.01); *G06T 2207/10021* (2013.01); *H04N 2213/002* (2013.01)

(58) Field of Classification Search
None
See application file for complete search history.

(56) References Cited

U.S. PATENT DOCUMENTS

| | | | | |
|---|---|---|---|---|
| 5,020,878 | A * | 6/1991 | Brokenshire et al. | 359/466 |
| 6,584,219 | B1 * | 6/2003 | Yamashita et al. | 382/154 |
| 6,686,926 | B1 | 2/2004 | Kaye | |
| 7,679,616 | B2 * | 3/2010 | Nomura et al. | 345/419 |
| 8,131,064 | B2 * | 3/2012 | Mashitani et al. | 382/154 |
| 8,330,801 | B2 * | 12/2012 | Wang et al. | 348/46 |
| 8,474,896 | B2 * | 7/2013 | Ostberg | 296/37.6 |
| 8,482,598 | B2 * | 7/2013 | Hiramatsu et al. | 348/46 |
| 2005/0244050 | A1 * | 11/2005 | Nomura et al. | 382/154 |
| 2007/0047040 | A1 * | 3/2007 | Ha | 359/24 |
| 2007/0159476 | A1 | 7/2007 | Grasnick | |
| 2008/0150945 | A1 | 6/2008 | Wang et al. | |

(Continued)

FOREIGN PATENT DOCUMENTS

| | | |
|---|---|---|
| CN | 101843107 | 9/2010 |
| EP | 1489857 | 12/2004 |

(Continued)

OTHER PUBLICATIONS

Yi et al., "Estimation of Depth and 3D Motion Parameters of Moving Objects with Multiple Stereo Images by Using Kalman Filter", Industrial Electronics, Control, and Instrumentation, 1995, vol. 2, Nov. 6, 1995, pp. 1225-1230.
European Search Report dated Jan. 13, 2011.
Gunnewiek et al., "How to display 3d content realistically", Proceedings of the Fifth International Workshop on Video Processing and Quality Metrics for Consumer Electronics (VPQM 2010), Jan. 2010, Scottsdale, AZ, U.S.A, pp. 1-6.

(Continued)

*Primary Examiner* — Jay Patel
*Assistant Examiner* — Reza Aghevli
(74) *Attorney, Agent, or Firm* — Myers Wolin LLC

(57) ABSTRACT

A method for adapting 3D video content to a display under different viewing conditions is disclosed. The method has the steps of:
retrieving a stereoscopic image pair;
obtaining a maximum disparity value for the stereoscopic image pair;
determining a largest allowable shift for the stereoscopic image pair using the obtained maximum disparity value;
calculating an actual shift for a left image and a right image of the stereoscopic image pair using the determined largest allowable shift; and
shifting the left image and the right image in accordance with the calculated actual shift.

8 Claims, 3 Drawing Sheets

(56) References Cited

U.S. PATENT DOCUMENTS

2009/0141022 A1* 6/2009 Kimpe .................. 345/419
2010/0231691 A1 9/2010 Lee

FOREIGN PATENT DOCUMENTS

| | | |
|---|---|---|
| JP | 09121370 | 5/1997 |
| JP | 2003284093 | 10/2003 |
| JP | 2005165032 | 6/2005 |
| WO | WO2010046824 | 4/2010 |
| WO | WO2010095074 | 8/2010 |

OTHER PUBLICATIONS

Chamaret et al., "Adaptive 3D rendering based on region-of-interest", Proceedings of Stereoscopic Displays and Applications, SPIE/IS&T Electronic Imaging, Jan. 2010, San Jose, CA, USA, pp. 1-12.

Schowengerdt et al., "True three-dimensional displays that allow viewers to dynamically shift accommodation, bringing objects displayed at different viewing distances into and out of focus", Cyberpsychology & Behavior, vol. 7, No. 6, Dec. 2004, pp. 610-620.

Dodgson, N., "Analysis of the viewing zone of Multi-view autostereoscopic displays", Applied Optics, Stereoscopic Displays and Applications XIII, San Jose California, USA, Jan. 21, 2002, pp. 1-12.

* cited by examiner

ADAPTATION OF 3D VIDEO CONTENT

This application claims the benefit, under 35 U.S.C §119 of EP Patent Application 10306023.2, filed 23 Sep. 2010.

FIELD OF THE INVENTION

The present invention relates to the field of displaying 3D video content, and more specifically to the adaptation of 3D video content for display under different viewing conditions.

BACKGROUND OF THE INVENTION

The production of 3D video is to a large extent determined by the targeted viewing conditions, e.g. cinema projection in a theatre or display on a domestic 3D-TV display. The main parameters that are taken into account during production are is the width of the targeted screen and the distance between the viewer and the screen.

When 3D video content designed for specific viewing conditions shall be displayed under different viewing conditions, the 3D video content should be modified to fit these new viewing conditions. Otherwise the 3D experience quality may be rather low due to shallow 3D effects or discomfort and visual fatigue. Despite this problem, today generally no kind of adaptation is performed. This sometimes leads to very poor 3D effects, e.g. when playing 3D movies excerpts or trailers on a 3D-TV display.

With the current growth of the 3D Cinema market the adaptation of 3D video content will become an important issue for the replication and distribution of 3D-DVD (Digital Versatile Disc) and 3D-BD (BluRay Disc). The goal is to avoid the need to handle several masters for the same 3D video content.

Today the most primarily investigated approach for adaptation of 3D video content consists in synthesizing new "virtual" views located at the ideal camera positions for the targeted viewing conditions. This view synthesis enables pleasing 3D effects without altering the structure of the scene shot. However, view synthesis is complex and expensive in terms of computations. It requires the delivery of high quality disparity maps along with color video views, as the use of poor quality disparity maps induces unacceptable artifacts in the synthesized views. Though for computer-generated content the generation of the required disparity maps is rather easy, for natural video contents this is a rather challenging task. Up to now no reliable chain from disparity estimation to view synthesis is available.

Even if improved solutions for disparity estimation become available, it still remains desirable to provide a reasonable, low-complex adaptation solution, e.g. for 3D set-top boxes.

SUMMARY OF THE INVENTION

Accordingly, it is an object of the present invention to propose a solution for adaptation of 3D video content to different viewing conditions, which can be implemented with low complexity.

According to the invention, this object is achieved by a method for adapting 3D video content to a display, which has the steps of:
  retrieving a stereoscopic image pair;
  obtaining a maximum disparity value for the stereoscopic image pair;
  determining a largest allowable shift for the stereoscopic image pair using the obtained maximum disparity value;
  calculating an actual shift for a left image and a right image of the stereoscopic image pair using the determined largest allowable shift; and
  shifting the left image and the right image in accordance with the calculated actual shift.

Similarly, an apparatus for adapting 3D video content to a display has:
  an input for retrieving a stereoscopic image pair;
  a disparity determination unit for obtaining a maximum disparity value for the stereoscopic image pair;
  a maximum shift determination unit for determining a largest allowable shift for the stereoscopic image pair from the obtained maximum disparity value;
  an actual shift calculation unit for calculating an actual shift for a left image and a right image of the stereoscopic image pair from the determined largest allowable shift; and
  an image shifting unit for shifting the left image and the right image in accordance with the calculated actual shift.

The invention proposes an adaptation of the 3D content by performing a view shifting on a frame-by-frame basis. The 3D effect is increased by moving back the scene with regard to the screen, i.e. by moving the views apart. To this end, in order to adapt a 3D movie to a 3D-TV the left view is shifted to the left and the right view is shifted to the right. Though this alters the scene structure with regard to what the director of the movie originally chose, the 3D effect is optimized. A real-time control adapted to the content, or more specifically adapted to the amount of disparity of each stereoscopic image pair, is implemented to ensure that the resulting depth remains in the visual comfort area. For this purpose advantageously the highest disparity value is transmitted for each stereoscopic image pair. Alternatively, the highest disparity value is obtained by a search for the maximum value within a complete disparity map that is transmitted for the stereoscopic image pair. As a further alternative, the highest disparity value is obtained by a disparity estimation feature. In this case a coarse, block-based implementation of the disparity estimation is sufficient.

The solution according to the present invention allows a reliable and fast adaptation of 3D video content to a display device. The 3D effect is optimized while granting the viewer comfort without implementing a depth-based synthesis, which is expensive in terms of computation and hazardous when poor quality depth maps are used.

Advantageously, the successive shifting steps are complemented with a temporal filtering, e.g. Kalman filtering, which is a second order filtering, to smoothen the temporal behavior of the display adaptation. Temporal filtering allows to prevent annoying jittering 3D artifacts in the resulting 3D content. Such artifacts are especially likely when depth estimation is required. For natural content, disparity maps may present frame-by-frame estimation errors, which could harm the final depth perception. By temporal filtering a smooth variation of the pixel shift is achieved. For CGI contents (Computer-Generated Imagery) supplied with their own depth maps, temporal filtering is not necessarily performed.

Preferably, the viewer has the possibility to adjust the shift of the left view and the right view with an interface, e.g. an interface similar to the volume or the contrast bar.

Advantageously, the shifted left image and the shifted right image are sent directly to the display. Alternatively, the shifted left image and the shifted right image are stored on a storage medium for displaying them later.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
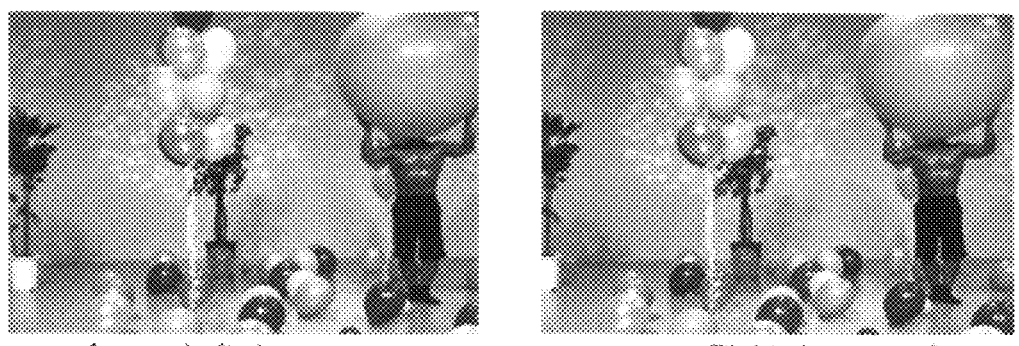
FIG. 1 shows a stereoscopic image pair.

In FIG. 1 a stereoscopic image pair is shown. The image pair consists of a left view 40 and a right view 50. Each image 40, 50 has a width of 1024 pixels and a height of 768 pixels. The two images 40, 50 were taken with a camera pair having an inter-camera distance of $t_c$=10 cm and a focal length of f=2240 pixels. The distance of the convergence plane from the camera basis was $Z_{conv}$=+∞. The near clipping plane was located at $Z_{near}$=4.48 m, the far clipping plane at $Z_{far}$=112.06 m. The maximum distance of the objects in the images 40, 50 was $Z_{max}$≈12 m, the minimum distance $Z_{min}$≈5 m.

Figure 2:
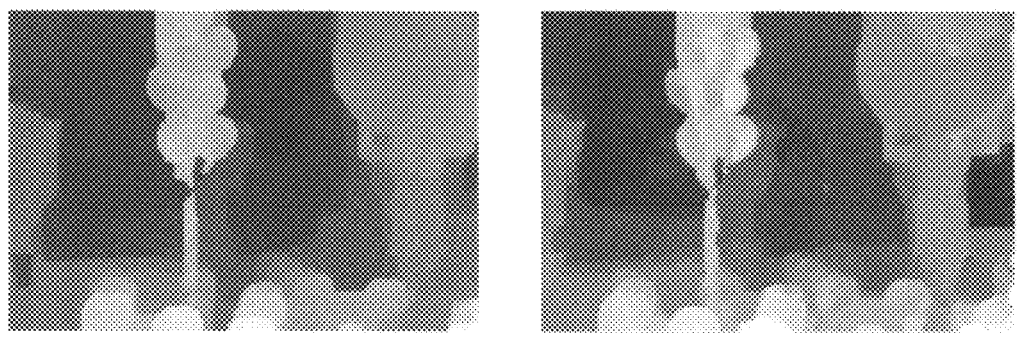
FIG. 2 depicts depth maps of the stereoscopic image pair of FIG. 1.

The depth maps 41, 51 of the stereoscopic image pair of FIG. 1 are depicted in FIG. 2. An object located in the near clipping plane would correspond to pure white values. Accordingly, an object located in the far clipping plane would correspond to pure black values. The disparity d(Z) for a given depth Z is given by $$d(Z) = t_c \times f \times \left(\frac{1}{Z_{conv}} - \frac{1}{Z}\right).$$

With $Z_{conv}$=+∞, the above equation simplifies to $$d(Z) = -\frac{t_c}{Z} \times f.$$

Therefore, for $Z_{conv}$=+∞ the maximum disparity is negative, i.e. $d_{max}$<0. Using the above formula, the minimum depth $Z_{min}$ results in a minimum disparity of $d_{min}$≈−44.8 pixels, whereas the maximum depth $Z_{max}$ results in a maximum disparity of $d_{max}$≈−18.7 pixels. As a rule parallax and disparity are positive for objects located behind the screen ($Z>Z_{conv}$), whereas they are negative for objects located in front of the screen ($Z<Z_{conv}$).

To look at a three-dimensional object in real life, the eyes of a viewer need to do two things. Firstly they must verge, i.e. they must rotate slightly inward or outward so that the projection of an image is always in the center of both retinas. Secondly, the eyes must accommodate, i.e. change the shape of each lens to focus the image on the retinas. Artificial 3D, however, causes a vergence-accommodation conflict. The viewer must focus at one distance, where the light is emitting from the screen, but verge at another distance, namely the spatial position of the 3D object. This vergence-accommodation conflict may lead to headaches and other discomforts.

Figure 3:
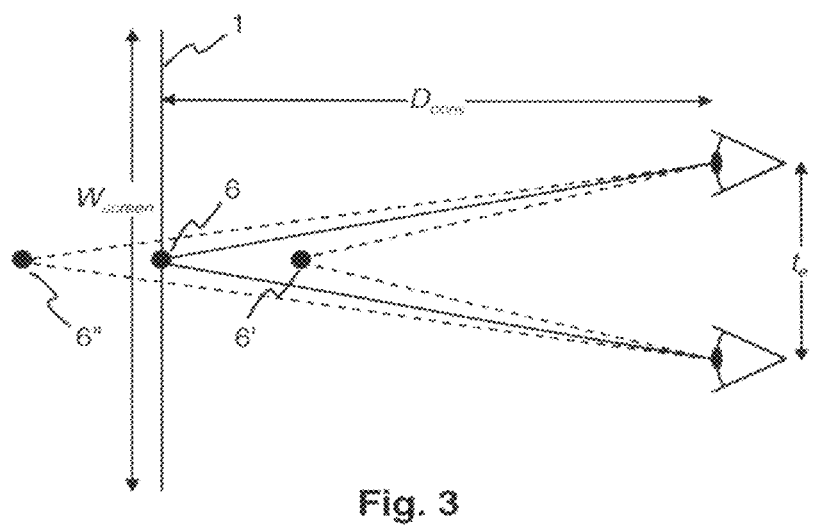
FIG. 3 gives an explanation of the vergence-accommodation conflict.

The vergence-accommodation conflict is schematically illustrated in FIG. 3. The viewer, whose eyes are separated by an inter-ocular distance t, focuses on a screen 1 with a width $W_{screen}$. As long as the viewer verges on an object 6 located in the plane of the screen 1, there is no vergence-accommodation conflict. In this case the vergence distance $D_{conv}$ is equal to the accommodation distance of the eyes. If, however, the viewer verges to an object 6' located before the screen or an object 6" located behind the screen, the vergence distance $D_{conv}$ is different from the accommodation distance of the eyes.

Due to this vergence-accommodation conflict there are a lower parallax bound and an upper parallax bound, which limit the depth range where objects may be located. The lower parallax bound designates the largest distance to the front of the screen where an object may be displayed, whereas the upper parallax bound designates the corresponding distance to the back of the screen.

Figure 4:
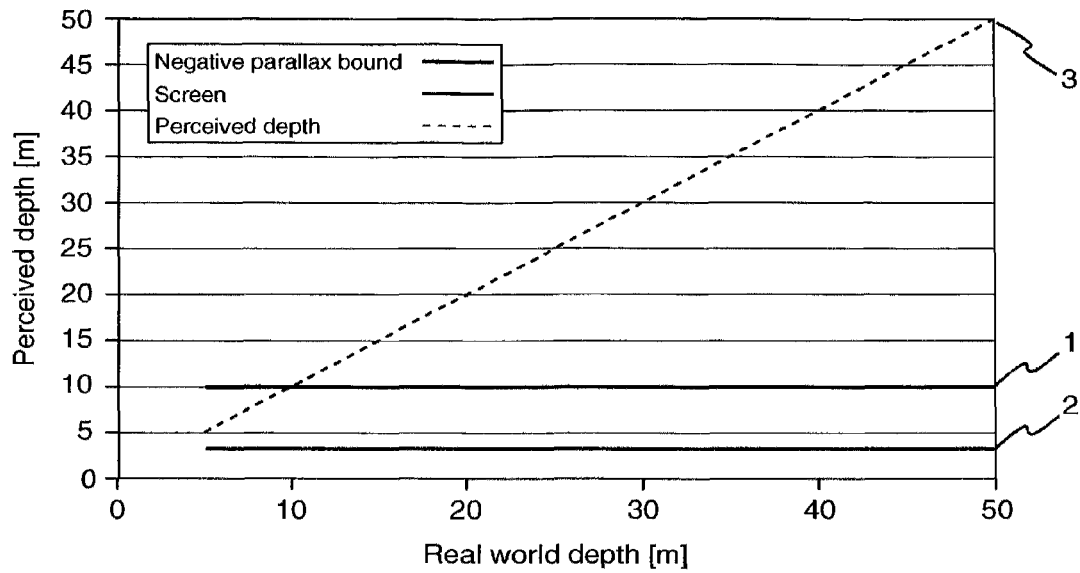
FIG. 4 depicts the depth situation for a cinema movie scene.

FIG. 4 illustrates the depth situation for a cinema movie scene. Drawn is the depth perceived by a viewer against the depth of the objects in real world. The figure is based on a cinema movie scene without any particular effect, i.e. there is a linear relationship between the depth that has been shot and the depth perceived by the viewers. In the figure, the thick black line 1 corresponds to the position of the cinema screen. Typically, the cinema screen is located at a distance of 10 m from the viewer. The thick dark grey line 2 corresponds to the lower bound for negative parallax values. In cinema there is no upper parallax bound because the screen is far enough away from the viewer. The viewer can look into the infinite without feeling any accommodation pain. As the movie scene under consideration does not present any specific 3D effect, i.e. there is no stereoscopic distortion, the depth perceived by the viewer, which is illustrated by the dashed black line 3, corresponds to the depth of objects that have been shot.

Figure 5:
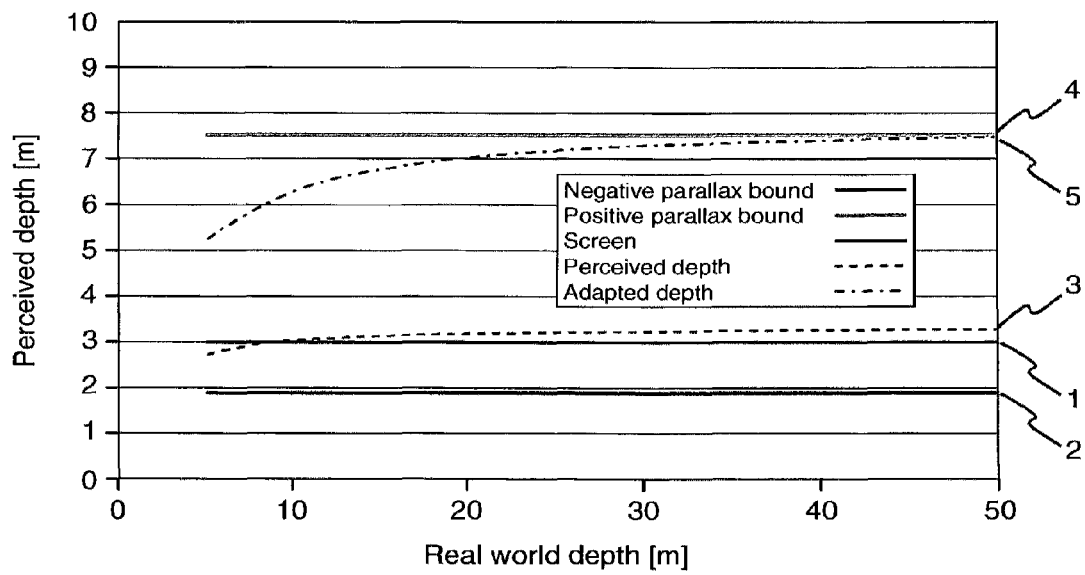
FIG. 5 shows the depth situation when the movie scene is displayed on a domestic 3D-TV panel.

FIG. 5 illustrates the corresponding depth situation when the movie scene is displayed on a domestic 3D-TV panel. In this case the distance to the screen changes to typically about 3 m. As a consequence, an upper parallax bound appears. The upper parallax bound is illustrated by the light grey line 4. Obtaining 3D effects that are comparable to the 3D effects that are achieved in a cinema is impossible because of the limited visual comfort area. Indeed, at home the viewer is located too close to the screen. As a consequence looking into the infinite while still accommodating on the screen yields visual fatigue. If no adaptation is performed, the movie scene only presents poor 3D effects, which is illustrated by the dashed black line 3. The solution according to the present invention, which moves the scene further to the back behind the screen, allows to increase the depth perception, without exceeding the visual comfort area. This is shown by the dash-dotted black line 5.

In the following the basis for the adaptation process that is performed in order to achieve the increased depth perception illustrated by the dash-dotted black line 5 in FIG. 5 shall be described.

A stereoscopic image pair of a frame t with a disparity $d_{max}(t)$ is assumed. The value $d_{max}(t)$ denotes the highest disparity value in pixels of the stereoscopic image pair. A priori $d_{max}(t)$>0. The value $d_{max}(t)$ is either transmitted as metadata for the stereoscopic image pair or obtained by a search for the maximum value within a complete disparity map that is transmitted for the stereoscopic image pair. Alternatively, a disparity estimation feature is implemented in the 3D-TV display or a connected set-top box. In this case a coarse, block-based implementation is sufficient.

Consider $$d_\infty = \frac{N_{row}}{W_{screen}} \times t_e,$$

where $N_{row}$ denotes the number of pixels per line, $W_{screen}$ is the width of the domestic screen in meters, and $t_e$ denotes the viewer's inter-ocular distance. For an adult $t_e$=0.065 m, whereas for a child $t_e$=0.04 m.

Let D stand for the distance from viewer to the 3D-TV screen. The highest disparity amount $d_{MAX}^{display}$ that is allowable for these viewing conditions is given by:

$$d_{MAX}^{display} = \min\left\{d_\infty \times \frac{D}{M}; d_\infty\right\},$$

where the value 1/M in diopters corresponds to the vergence-accommodation conflict tolerance that is admitted by the manufacturer of the set-top box or the 3D-TV display. Advantageously, a HDMI connection is used for this purpose. Consequently, the largest allowable shift $h_{MAX}(t)$ for a frame t is given by:

$$h_{MAX}(t) = d_{MAX}^{display} - d_{max}(t).$$

The actual shift h(t) may be any value between 0 and $h_{MAX}(t)$, according to the viewer's preferences, with a shift of h(t)/2 pixels to the left for the left view and a shift of h(t)/2 pixels to the right for the right frame. Advantageously the viewer has the possibility to adjust the shift with an interface similar to the volume or the contrast bar. This adjustment is expressed by a factor α, which may assume values between 0 and 1.

$$h(t) = \alpha \times h_{MAX}(t) \quad \alpha \in [0;1]$$

In practice shift values h(t) up to ~60 pixels, i.e. 30 pixels per view, are obtained. This corresponds to about 3% of the horizontal resolution, which is an acceptable value.

Preferably, a temporal filtering feature is implemented to smoothen temporal variations of $d_{max}$. It has been found that such temporal filtering, e.g. Kalman filtering, is feasible and remains unnoticeable to the viewer.

Figure 6:
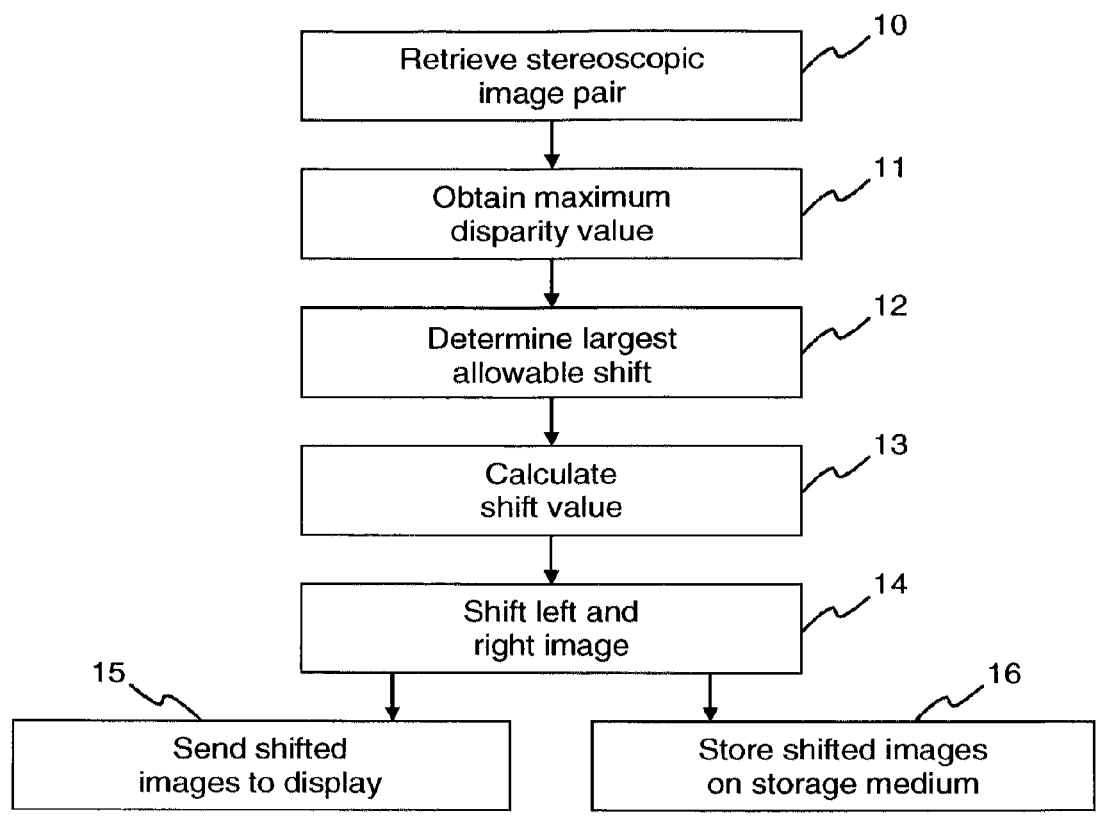
FIG. 6 shows a flow chart of an adaptation method according to the invention.

An adaptation method according to the invention is shown in FIG. 6. In a first step 10 a stereoscopic image pair is received. Then the maximum disparity value $d_{max}(t)$ is obtained 11, either from metadata transmitted together with the stereoscopic image pair or by a disparity estimation. In the next step 12 the largest allowable shift $h_{MAX}(t)$ is determined, e.g. as described above. From the value $h_{MAX}(t)$, and advantageously also from the user settable shift adjustment parameter α, the final shift h(t) for the frame, or rather the shift value h(t)/2 for the left image and the right image, are calculated 13. The left image and the right image are the shifted 14 accordingly and sent 15 to a display or stored 16 on a storage medium.

Figure 7:
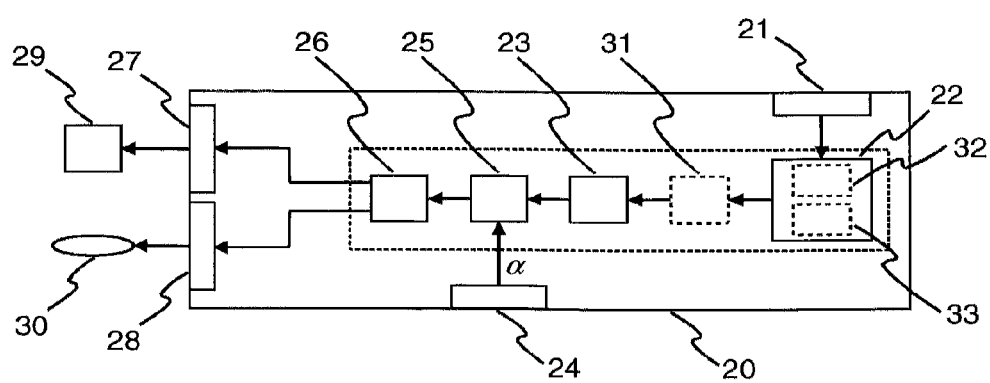
FIG. 7 schematically illustrates an apparatus for performing the adaptation method according to the invention.

An apparatus 20 for performing the adaptation method according to the invention is schematically illustrated in FIG. 7. The apparatus 20 comprises an input 21 for receiving 10 a stereoscopic image pair. A disparity determination unit 22 obtains 11 the maximum disparity value $d_{max}(t)$, either from metadata transmitted together with the stereoscopic image pair using a metadata evaluation unit 32 or by a disparity estimation using a disparity estimator 33. An optional temporal filter 31 downstream of the disparity determination unit 22 performs a temporal filtering on the maximum disparity value $d_{max}(t)$. A maximum shift determination unit 23 determines 12 the largest allowable shift $h_{MAX}(t)$. Preferably the apparatus 20 has a user interface 24, which enables the viewer to set a shift adjustment parameter α. An actual shift calculation unit 25 calculates the final shift h(t) for the frame, or rather the shift value h(t)/2 for the left image and the right image, taking into account the shift adjustment parameter α. An image shifting unit 26 shifts 14 the left image and the right image accordingly. Finally, outputs 27, 28 are provided for sending 15 the shifted images to a display 29 or for storing 16 the shifted images on a storage medium 30. Apparently, the different units may likewise be incorporated into a single processing unit. This is indicated by the dashed rectangle. Also, the user interface 24 does not necessarily need to be integrated in the apparatus 20. It is likewise possible to connect the user interface 24 to the apparatus 20 via an input. For example, when the adaptation method according to the invention is performed in a set-top box, the user interface 24 may be provided by a connected display or a personal computer, which then transmits the adjustment parameter α to the set-top box.

What is claimed is:

1. A method for adapting 3D video content to a display, the method comprising:
   retrieving a stereoscopic image pair;
   obtaining a maximum disparity value for the stereoscopic image pair from a disparity map or from a disparity value provided as a metadata along with the stereoscopic image pair;
   determining a largest allowable shift for the stereoscopic image pair, the largest allowable shift being a difference between a highest disparity amount that is allowable for a viewing condition and the obtained maximum disparity value;
   calculating an actual shift for a left image and a right image of the stereoscopic image pair using the determined largest allowable shift; and
   shifting the left image and the right image in accordance with the calculated actual shift; or
   retrieving a user input of a shift adjustment parameter, wherein the shift adjustment parameter limits the actual shift for the left image and the right image of the stereoscopic image pair to a value between zero and the determined largest allowable shift.

2. The method according to claim 1, further comprising smoothing the maximum disparity value by temporal filtering before determining the largest allowable shift.

3. The method according to claim 2, wherein temporal filtering is performed by Kalman filtering.

4. The method according to claim 1, further comprising sending the shifted left image and the shifted right image to the display or storing the shifted left image and the shifted right image on a storage medium.

5. An apparatus configured to adapt 3D video content to a display, the apparatus comprising:
   an input for retrieving a stereoscopic image pair;
   a disparity determination unit configured to obtain a maximum disparity value for the stereoscopic image pair from a disparity map or from a disparity value provided as a metadata along with the stereoscopic image pair;
   a maximum shift determination unit configured to determine a largest allowable shift for the stereoscopic image pair, the largest allowable shift being a difference between a highest disparity amount that is allowable for a viewing condition and the obtained maximum disparity value;

an actual shift calculation unit for calculating an actual shift for a left image and a right image of the stereoscopic image pair from the determined largest allowable shift; and an image shifting unit configured to shift the left image and the right image in accordance with the calculated actual shift; or a user interface connected to the actual shift calculation unit configured to set a shift adjustment parameter, wherein the shift adjustment parameter limits the actual shift for the left image and the right image of the stereoscopic image pair to a value between zero and the determined largest allowable shift.

6. The apparatus according to claim 5, further comprising a smoothing filter downstream of the disparity determination unit configured to smooth the maximum disparity value by temporal filtering before determining the largest allowable shift.

7. The apparatus according to claim 6, wherein the smoothing filter is a Kalman filter.

8. The apparatus according to claim 5, further comprising a first output configured to send the shifted left image and the shifted right image to the display or a second output configured to store the shifted left image and the shifted right image on a storage medium.

* * * * *